United States Patent
Ichinose et al.

(10) Patent No.: US 7,131,426 B2
(45) Date of Patent: Nov. 7, 2006

(54) FLUID FLOW RATE CONTROL VALVE, ANCHOR FOR MOVER AND FUEL INJECTION SYSTEM

(75) Inventors: Takeshi Ichinose, Saitama-ken (JP); Jochen Wessner, Esslingen (DE); Hermann Keimer, Winnenden (DE); Wolfgang Klink, Waiblingen (DE); Tilman Miehle, Waiblingen (DE)

(73) Assignees: Bosch Corporation, Tokyo (JP); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/493,860

(22) PCT Filed: Nov. 27, 2002

(86) PCT No.: PCT/JP02/12365

§ 371 (c)(1),
(2), (4) Date: Apr. 27, 2004

(87) PCT Pub. No.: WO03/048558

PCT Pub. Date: Jun. 12, 2003

(65) Prior Publication Data

US 2004/0261771 A1    Dec. 30, 2004

(30) Foreign Application Priority Data

Nov. 27, 2001   (JP) .............................. 2001-361044

(51) Int. Cl.
*F02M 37/04* (2006.01)
(52) U.S. Cl. ...................... 123/446; 123/458; 335/262; 251/129.07
(58) Field of Classification Search ................ 123/446, 123/458, 462, 460; 251/129.07; 335/228, 335/261, 262, 279
See application file for complete search history.

(56) References Cited

U.S. PATENT DOCUMENTS

| | | | | |
|---|---|---|---|---|
| 4,884,545 A | * | 12/1989 | Mathis | 123/447 |
| 5,138,291 A | * | 8/1992 | Day | 335/258 |
| 5,217,047 A | | 6/1993 | McCabe | 137/625.61 |
| 5,927,322 A | | 7/1999 | Rosenau | 137/487 |
| 6,062,823 A | * | 5/2000 | Kawaguchi et al. | 417/222.2 |
| 6,446,606 B1 | * | 9/2002 | Krimmer et al. | 123/458 |
| 6,581,577 B1 | * | 6/2003 | Geyer | 123/514 |
| 6,694,950 B1 | * | 2/2004 | Djordjevic | 123/446 |
| 6,778,049 B1 | * | 8/2004 | Alyanak | 335/255 |
| 6,823,845 B1 | * | 11/2004 | Schueler | 123/446 |
| 6,943,657 B1 | * | 9/2005 | Subramanian et al. | 335/261 |

(Continued)

FOREIGN PATENT DOCUMENTS

JP     2001-248521     9/1920

(Continued)

*Primary Examiner*—Carl S. Miller
(74) *Attorney, Agent, or Firm*—Frommer Lawrence & Haug LLP; Ronald R. Santucci

(57) ABSTRACT

To effectively prevent uneven wear of a moving mover 70 and to stabilize the control characteristics by a valve. Rotation force is exerted to the mover 70 by the fluid flowing from the first chamber to the second chamber, or vice versa, which are formed at the opposite ends of the mover 70. With respect to a flow passageway 110 formed within an anchor 72 and for allowing passage of the fluid therethrough, there are provided a passageway portion 111 which is disposed along the axial direction and another passageway portion 112 which crosses the axial direction. By this, rotation force is generated at the time the fluid passes from the former passageway portion 111 to the latter passageway portion 112 (or vice versa) which crosses the axial direction.

9 Claims, 6 Drawing Sheets

U.S. PATENT DOCUMENTS

2001/0023930 A1* 9/2001 Kobayashi et al. .... 251/129.14

FOREIGN PATENT DOCUMENTS

| JP | 03-156164 | 7/1991 |
|---|---|---|
| JP | 05-180318 | 7/1993 |
| JP | 07-224960 | 8/1995 |
| JP | 11-094097 | 4/1999 |
| JP | 2000-146007 | 5/2000 |
| JP | 2002-530568 | 9/2002 |
| JP | 2003-533638 | 11/2003 |

* cited by examiner

FLUID FLOW RATE CONTROL VALVE, ANCHOR FOR MOVER AND FUEL INJECTION SYSTEM

This application is a 371 of PCT/JP02/12365 filed on Nov. 27, 2002 and claims priority benefits of Japanese Patent Application No. 2001-361044 filed Nov. 27, 2001.

FIELD OF THE INVENTION

This invention relates to a flow rate control valve for controlling the flow rate of fluid flowing through a valve by controlling opening/closing of the valve under the effect of electromagnetic force. More particularly, it relates to a technique which is suitably used as a flow rate control valve for controlling an amount of fuel used for a vehicle such as a diesel engine or the like.

BACKGROUND OF THE INVENTION

In general, an electromagnetic flow rate control valve comprises a circular cylindrical solenoid which generates magnetic field when electric current is supplied thereto and a mover which moves in the axial direction under the effect of electromagnetic force when the solenoid is magnetized. The mover is located in an internal space of a housing and normally, it has a circular columnar configuration. The circular columnar mover has closed first and second chambers which are defined in opposite end portions thereof. In case of a valve for controlling the flow rate of fluid, the fluid enters the internal space of the housing where the fluid fills the first and second chambers which are defined in the opposite end portions of the mover. Thus, in order to make it possible for the mover to move smoothly without encountering resistance, there is provided a passageway in the mover, which passageway intercommunicates the first and second chambers.

Problem(s) to be Solved by the Invention

A flow rate control valve of the type just mentioned above can be applied to a wide range of technical field. In one application, the flow rate control valve is used with the axial direction of the valve displaced from the perpendicular direction. For example, in case the flow rate control valve is used in a diesel engine of a vehicle, the valve must be placed with its axis held in a horizontal or semi-horizontal state because of its positional relation with the pump driven by the engine. The moving mover is supported at a plural spots, normally at two spots, which are away from each other in the axial direction. Thus, there is such a fear that sliding wear (uneven wear) occurs especially at the contact area of the supporting points, thus making it impossible for the mover to slidingly move in a correct manner. Moreover, in some instances, the mover must be supported in a cantilever fashion, namely, supported at one spot in the axial direction. Here again, there is a fear that uneven wear occurs. If such a situation should occur, the correct flow rate controlling would be interrupted. In addition, in case of a common rail system (pressure accumulation type injection system), for example, inferior pressure controlling would occur with a result that foreign engine noises are generated. With respect to a flow rate control valve and a common rail system of the type as just mentioned above, reference is made, for example, to Japanese Patent Application Laid-Open No. H11-94097 and Japanese Patent Application Laid-Open No. 2001-221130. As shown in those Laid-Open publications, a fuel injection system including a flow rate control valve of this type (i.e., amount control throttle valve) normally comprises a low pressure feed pump for pumping up fuel oil as fluid from a fuel tank, an amount control throttle valve for controlling the amount of fuel oil fed by the feed pump, under the effect of throttling action and a supply pump for boosting the fuel oil, which has been controlled in amount by the amount control throttle valve, to higher pressure by movement of a plunger and supplying the same to fuel injection means. The amount control throttle valve has an overflow valve attached thereto. Therefore, excessive fuel oil is returned to the fuel tank by the overflow valve. As the supply pump for executing a pumping action in accordance with reciprocal motion of the plunger, there can, of course, be listed not only a pump of an axial type explicitly shown in the above-mentioned Japanese Patent Application Laid-Open No. 2001-221130 but also a pump of a radial type as disclosed, for example, by National Patent Publication No. 2001-500593 (corresponding to International Publication No. WO99/02861). Although the above-mentioned uneven wear is more manifest when the mover is placed in a horizontal posture, an ordinary person skilled in the art would know that uneven wear is liable to occur even when the mover is placed in a vertical posture. The reason is that the mover tends to be offset sideways under the effect of electromagnetic force.

It is, therefore, an object of the present invention to prevent uneven wear of a moving mover and to stabilize the controlling characteristics by a valve.

Another object of the present invention is to provide a technique which can easily be put in practice simply by exchanging an existing part or parts.

Further objects of the present invention will become more manifest from the description to follow.

Means for Solving the Invention

In the present invention, a moving mover is positively caused to rotate about its axis so that wear will occur evenly without allowing it to occur locally concentrically. As rotation means for rotating the mover, the inventor(s) of the present invention paid attention to the flow of fluid in the mover which flows from a first chamber to a second chamber, or vice versa, when the mover is in a moving position.

A stroke which a flow rate control valve of this type makes, including a flow rate control valve for controlling an amount of fluid, is approximately several mm to approximately 5 mm (for example, 3 mm) at most. Moreover, the pressure of the fluid passing through the valve is low. In this respect, the pressure of the fluid around the flow rate control valve in question is relatively low in comparison with the fluid, which is high in pressure, in a common rail as an accumulator. Even such low pressure fluid, in fact, flows in accordance with the movement of the mover. The present invention has adopted an original idea in that the mover is caused to rotate by using of a work of flowing fluid.

The rotation means for making the fluid work, rotation force is exerted to the mover by the fluid flowing from the first chamber to the second chamber, or vice versa. Firstly, with respect to a flow passageway which is formed within the mover and for allowing the fluid to flow therethrough, there are provided a passageway portion along the axial direction and another passageway portion crossing with the axial direction. In doing so, rotation force can be utilized, which is generated when the fluid passes from the former passageway portion to the latter crossing passageway portion (or vice versa). Accordingly, in order to generate effective rotation action, it is preferred that a plurality of flow passageways are provided and they are arranged in symmetrical relation about the axis. A single flow passageway, however, may be also employed.

Secondly, it is also accepted that the passageway for flowing the fluid from the first chamber to the second chamber, or vice versa, comprises a helical groove provided at the outer peripheral surface of the mover. The helical groove may be provided over the entire area from one end of the mover to the other end, or it may also be provided in combination with the passageway within the mover. For example, that portion which supports the mover, may be designed as an internal passageway and the helical groove is formed in the remaining portion which does not support the mover, such that the helical groove and the internal passageway are communicated with each other. Since the fluid passing through the helical groove is increased in so-called length of the arm in moment, it is expected that a larger rotation force is generated. Of course, it is also accepted that the first idea in which the rotation means is provided within the mover is combined with the second idea in which the passageway is provided at the outer peripheral surface of the mover.

Thirdly, it is also an interesting alternative that a spacer disposed at one end face portion of the mover has a function acting as the rotation means. Normally, the spacer at one end of the mover is separated from the mover. This spacer is purposely designed to be integral with the mover at one end face portion of the mover. Moreover, for example, there is provided a slantwise hole extending from the upper surface of the spacer to the lower surface, and/or the spacer is provided with a fan to be formed into a fan type spacer. Then, by passing the fluid into the slantwise hole or fan from the passageway on the side of the mover, rotation force can be exerted to the mover which is integral with the spacer. In the alternative, by providing a cam groove at the outer peripheral surface of the mover and a pin-like cam on the side of a bearing for carrying the mover, rotation force can also be exerted to the mover.

As in the present invention, it is desirous to provide a construction or supporting form which is designed such that the mover itself can rotate easily when it is required to be rotated. In this respect, a mover including a flow passageway which is offset from the axis, is not desirable because its gravity is offset from the axis. It is preferred that a plurality of flow passageways are provided, the mover is constructed in such a manner as to be symmetrical about the axis and the location of the gravity of the mover is aligned with the axis (i.e., center of rotation), so that the mover can rotate smoothly.

DETAILED DESCRIPTION OF THE EMBODIMENT(S)

When the present invention is applied to a flow rate control valve which requires flow rate control characteristics more delicately, the more significant merit can be obtained. From this point of view, the present invention can effectively be applied to an amount control valve for controlling an amount of fuel as fluid to be fed from a low pressure side to a high pressure side in a fuel injection system (diesel engine or gasoline engine) of a vehicle. The illustrated embodiment(s) is examples in which the present invention is applied to an amount control valve in a common rail system of a diesel engine.

Figure 1:
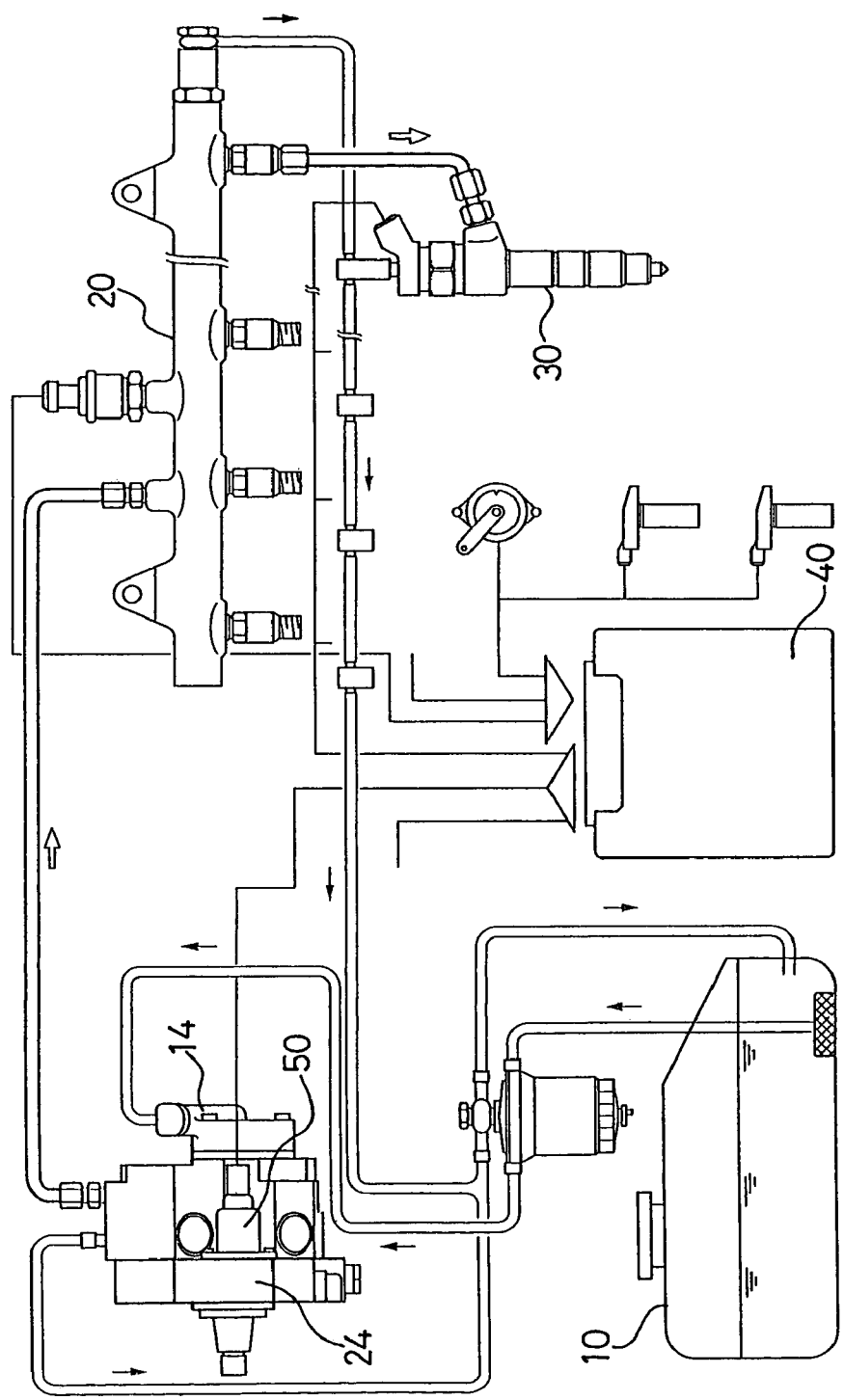
FIG. 1 is a piping system diagram showing one example of a common rail system to which the present invention is applied.

Referring first to FIG. 1, the outline of a common rail system of a diesel engine and the positional relation of an amount control throttle valve in the system will be described. The common rail system is a system in which fuel oil as fluid is pumped up from a fuel tank 10 and after the fuel oil is boosted to higher pressure, it is accumulated in a common rail 20, and then the high pressure fuel oil is supplied to a combustion chamber of the engine at the best timing and at the best injection amount. A low pressure fuel pumping up piping system includes a feed pump 14 comprising a gear pump, while a high pressure fuel piping system includes a plunger type supply pump 24. Since those pumps 14, 24 are driven by a vehicle engine, they are integrally formed. An amount control throttle valve 50 as a flow rate control valve in question is placed between the low pressure feed pump 14 side and the high pressure supply pump 24 side and has the function for controlling the amount of fuel oil to be fed from the former low pressure side to the latter high pressure side. Accordingly, the amount control throttle valve 50 is integrally supported on a pump housing which includes the feed pump 14 and the supply pump 24. Thus, because of the attachment layout, the amount control throttle valve 50 is normally disposed with the axes of the housing and a mover contained therein maintained in a generally horizontal posture. The general construction of such a common rail system is known as disclosed in the above-mentioned publications. The common rail system includes an electronic control unit (ECU) 40 having the function of a micro computer. The ECU 40 electromagnetically controls the amount control throttle valve 50 and an injector 30 based on the vehicle side data and the common rail 20 side data.

Figure 2:
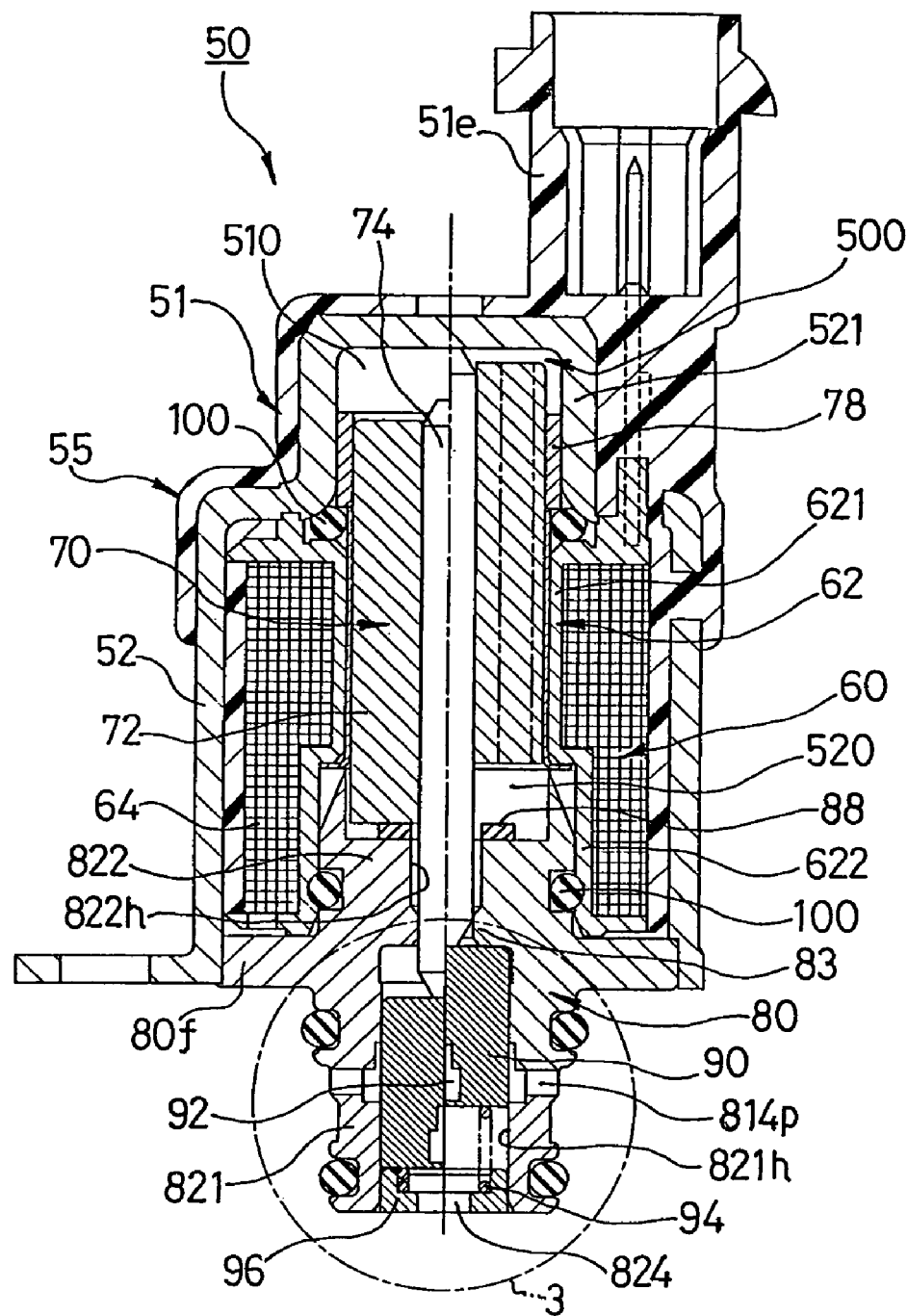
FIG. 2 is a sectional view of a construction of an amount control valve according to one embodiment of the present invention.

Referring next to FIG. 2 showing a sectional construction, the amount control valve 50 as a flow rate control valve will be described. An outer shell of the amount control valve 50 comprises a resin portion 51 including an input socket portion 51e and a metal-made case 52 integral with the resin portion 51. The metal case 52 and the resin portion 51 constitutes an outer casing 55 one end of which is closed and the other end is open, in the axial direction. A circular cylindrical solenoid 60 is fitted to the inner periphery of the outer casing 55 and a mover 70 is fitted to the inner periphery of the solenoid 60. The mover 70 comprises a circular cylindrical soft iron-based anchor 72 and a core rod 74 press fitted to the center hole of the anchor 72 and exhibits a circular columnar configuration as a whole. The solenoid 60 comprises a bobbin 62 of a two-stage structure which includes a reduced diameter portion 621 and an enlarged diameter portion 622, and a coil 64 wound around the outer periphery of the bobbin 62. The coil 64 is electrically connected to an input solenoid portion 51e and externally supplied with electric current.

A core 80 is fitted to an opening portion of the outer casing 55, thereby closing the opening portion. That is, the core 80, together with the outer casing 55, constitutes a housing of the amount control valve 50. The core 80 is a cylinder body which includes an outward flange 80f. A cylinder portion 822 on one side of the outward flange 80f is fitted to the inner periphery of the enlarged diameter portion 622 of the bobbin 62 and the outer periphery of the outward flange 80f is fitted to the opening portion of the outer casing 55. A hole 822h at a central area of the cylinder portion 822 on the one side is smaller in diameter than a hole 821h of a cylinder portion 821 on the other side. The hole 822h having a smaller diameter is such dimensioned as being able to receive therein the core rod 74 of the mover 70. A part of the inside of the hole 822h is defined as a guide portion 83 for supporting and guiding the core rod 74. FIG. 2 shows two states of the mover 70 in half-section in order to make clear of the movement of the mover 70. When the mover 70 moves in the axial direction by the electromagnetic force which is generated when the solenoid 60 is magnetized, the front end of the core rod 74 is, while being guided by the guide portion 83, brought into the hole 821h side of the cylinder portion 821 on the other side. A ring-like spacer 88 is disposed at an end face of the cylinder portion 822 on the one side. This spacer 88 is adapted to prevent the linkage or wringing of the end face of the anchor 72 of the mover 70 with the core 80 side. At the inner depth of the outer casing 55 (inner periphery of the reduced diameter portion 521 of the metal-made case 52), there is provided, for example, a ring-like stainless steel-made bush 78. This bush 78 functions as the other guide portion of the mover.

Figure 3:
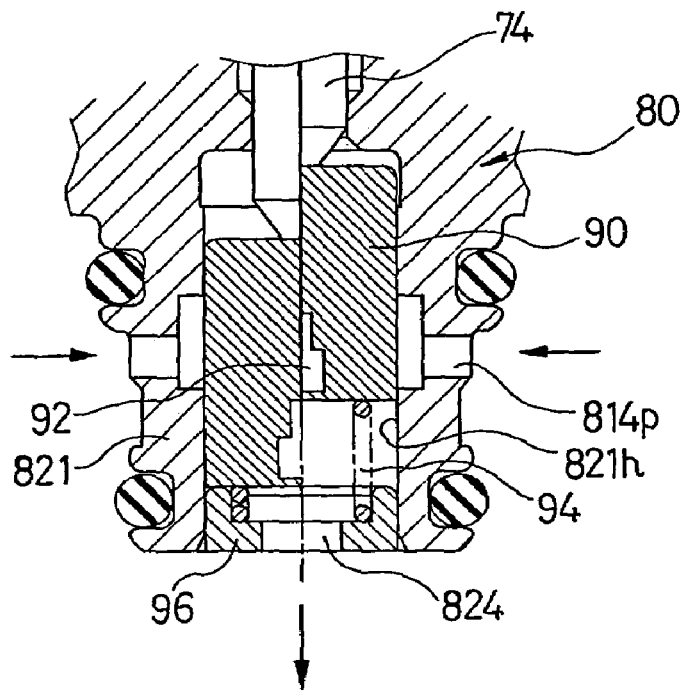
FIG. 3 is an enlarged sectional view of the portion indicated by 3 of FIG. 2.

A valve member 90 comprising a piston, is movably fitted to the hole 821h of the cylinder portion 821 on the other side of the core 80. As more clearly shown in the enlarged view of FIG. 3, the valve member 90 includes a slit 92 of two steps, one large and one small. This slit 92 can communicate with a port 814p which is in communication with the feed pump 14 side and a passageway 824 which is in communication with the supply pump 24 side. One end of the valve member 90 is in abutment with the front end of the core rod 74 on the mover 70 side and the other end is allowed to support one end of a coiled spring 94. The other end of the coiled spring 94 is supported by a retainer ring 96 which is press fitted to the opening portion of the cylinder portion 821. The spring force of the coiled spring 94 is set such that it is smaller than the electromagnetic force of the magnetized solenoid 60 but it is still large enough to move the mover 70 through the valve member 90 when no electromagnetic force is generated.

Figure 4:
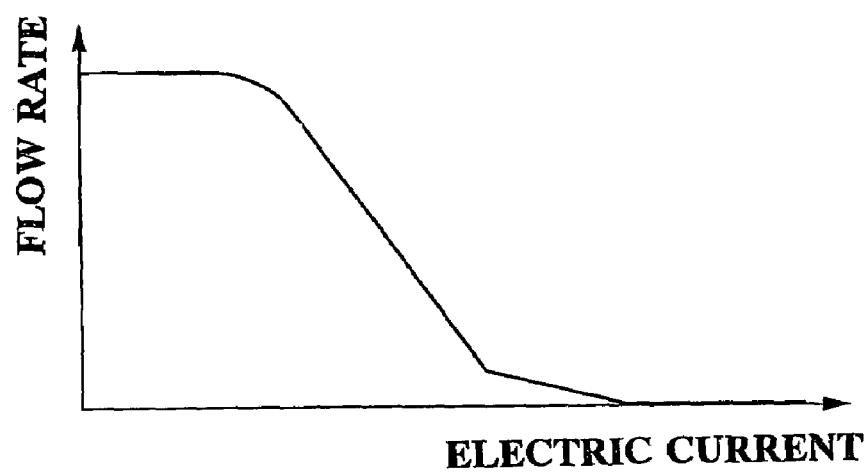
FIG. 4 is a chart showing the control characteristics of flow rate and electric current.

When the coiled spring 94 is compressed and the end face of the anchor 72 of the mover 70 is brought towards the spacer 88, the diesel engine is in an idling state. In contrast, when the coiled spring 94 presses the valve member 90 and the anchor 72 of the mover 70 is brought away from the spacer 88, the diesel engine is in a high-speed driving state. FIG. 4 shows one example of control characteristics when the electric current is plotted along the abscissa and the flow rate is plotted along the ordinate. Of course, it is also accepted that the control characteristics are arranged such that the flow rate is increased as the electric current is increased. In order to obtain high precision control characteristics and quick response, it is necessary to move the mover 70 as smoothly as possible.

Attention should now be paid to the internal space of the housing of the amount control valve 50 in which the mover 70 can move. Since each O-ring 100 is disposed at the outer peripheral portion of the cylinder portion 822 of the core 80 and between the case 52 and one end of the bobbin 62, the internal space 500 of the housing is a closed space. Moreover, since the clearance between the anchor 72 of the mover 70 and the bush 78 is, for example, approximately 15 µm, the mover 70 has a first chamber 510 and a second chamber 520, which are closed, defined in opposite end portions thereof. Since those first and second chambers 510, 520 are filled with the fuel oil as fluid, a flow passageway for intercommunicating the first and second chambers 510, 520 must be attached to the mover 70.

The present invention utilizes the flow of the fluid flowing through the flow passageway as means for causing the mover 70 to rotate about the axis. By causing the mover 70 to rotate, the supporting portion or guide portion of the mover 70 is worn over its entire area in the circumferential direction.

Thus, local uneven wear can effectively be prevented from occurring. As rotation means for using the flow for doing a work, plural examples may be applied or a combination of different examples may be applied. The rotation means can easily be obtained by partly changing or modifying the mover itself or the periphery of the mover.

MOVER INCLUDING ROTATION MEANS ACCORDING TO FIRST EXAMPLE

Figure 5:
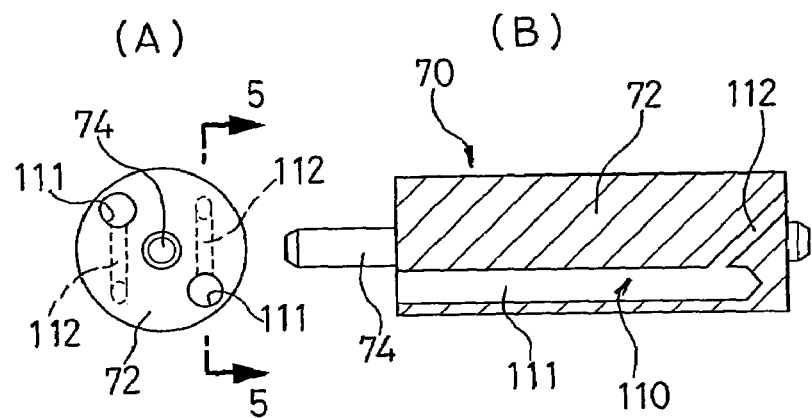
FIG. 5 is a view showing a mover including rotation means according to a first example, (A) is a side view and (B) is a sectional view taken on line 5—5 of (A).

FIG. 5 shows a mover 70 including rotation means according to a first example. As previously mentioned, the mover 70 comprises the anchor 72 and the core rod 74. The anchor 72 has a passageway 110 formed therein and extending from one end thereof to the other end in the axial direction. The passageway 110 is a flow passageway for intercommunicating the first and second chambers 510, 520. The flow passageway 110 includes a linear passageway portion 111 in parallel with and along the axis and a slantwise passageway portion 112 which extends from the linear passageway portion 111 in such a manner as to cross the axis. A pair of such flow passageways 110 are employed in this example and they are in a symmetrical arrangement about the axis. When the mover 70 moves in the axial direction, fuel oil flows through the passageways 110. Since the fuel oil abruptly changes the flowing direction between the linear passageway portion 111 and the slantwise passageway portion 112, a force is generated for whirling or rotating the mover 70. Especially, the symmetrical pair of flow passageways 110, 110 generates forces serving as the moment of a couple, thereby causing the mover 70 to rotate more reliably. Through experiments, it can be confirmed that the mover 70 is caused to rotate effectively by the flow flowing from the slantwise passageway portion 112 to the linear passageway portion 111 when the engine is cut off in its idling state.

MOVER INCLUDING ROTATION MEANS ACCORDING TO SECOND EXAMPLE

Figure 6:
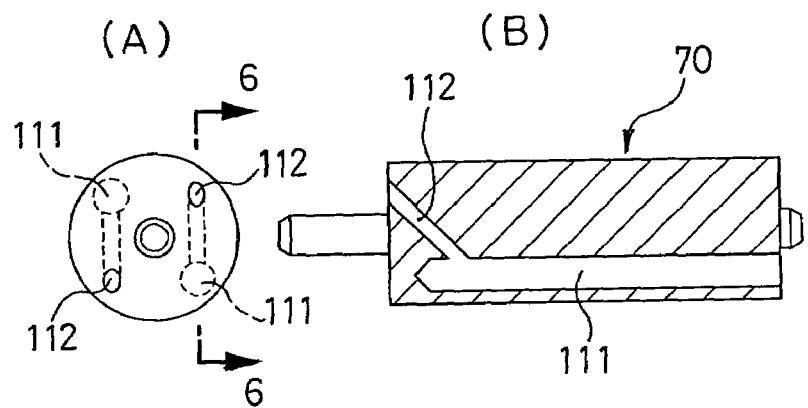
FIG. 6 is a view showing a mover including rotation means according to a second example, (A) is a side view and (B) is a sectional view taken on is line 6—6 of (A).

FIG. 6 shows a mover 70 including rotation means according to a second example. In this second example, the linear passageway portion 111 and the slantwise passageway portion 112 are reversely arranged from those of the first example, when viewed in the axial direction. Accordingly, the action for causing the mover 70 to rotate is same as in the first example.

MOVER INCLUDING ROTATION MEANS ACCORDING TO THIRD EXAMPLE

Figure 7:
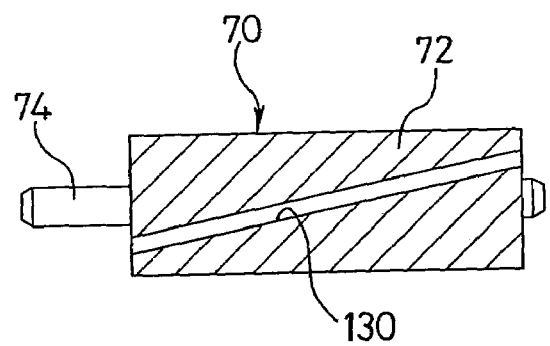
FIG. 7 is a sectional view showing a mover including rotation means according to a third example.

FIG. 7 shows a mover 70 including rotation means according to a third example. In the first and second examples, the linear passageway portion 111 is machined as a bottomed hole by taking into consideration of the bottomed hole machining procedure and then, the slantwise passageway portion 112 is made to communicate with the linear passageway portion 111. That is, although the bottomed hole machining is made twice in the first and second examples, the machining is made only once in this third example. For this purpose, a slantwise hole, which also serves as a flow passageway 130, is employed.

MOVER INCLUDING ROTATION MEANS ACCORDING TO FOURTH EXAMPLE

Figure 8:
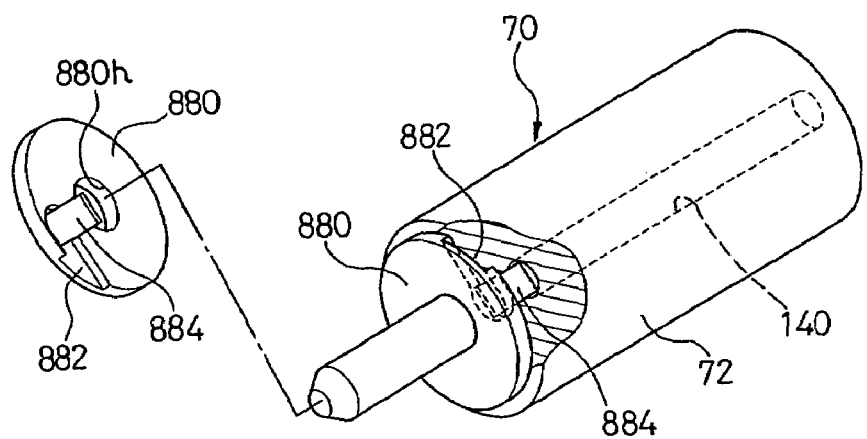
FIG. 8 is a perspective view, partly cut-away, showing a mover including rotation means according to a fourth example.

FIG. 8 shows a mover 70 including rotation means according to a fourth example. In the first through third examples, the rotation means comprises the hole or passageway formed in the mover 70. In contrast, in the fourth example, a spacer 880 is integrally formed on an end face of the anchor 72 of the mover 70 and rotation force is obtained by utilizing the spacer 880. The spacer 880, which is made from a non-magnetic resin material, includes a rotary groove 882 formed at a peripheral portion thereof and a support plate portion 884 standing in the rotary groove 882. The spacer 880 is integrally formed on the anchor 72 with a center hole 880h fitted to the outer periphery of the core rod 74 and with the support plate portion 884 fitted in the linear flow passageway portion 140 on the anchor 72 side. Thus, the fuel oil flowing through the linear flow passageway 140 hits one surface of the spacer 880 and exerts a rotation force to the mover 70 when it flows out through the rotary groove 882.

MOVER INCLUDING ROTATION MEANS ACCORDING TO FIFTH EXAMPLE

Figure 9:
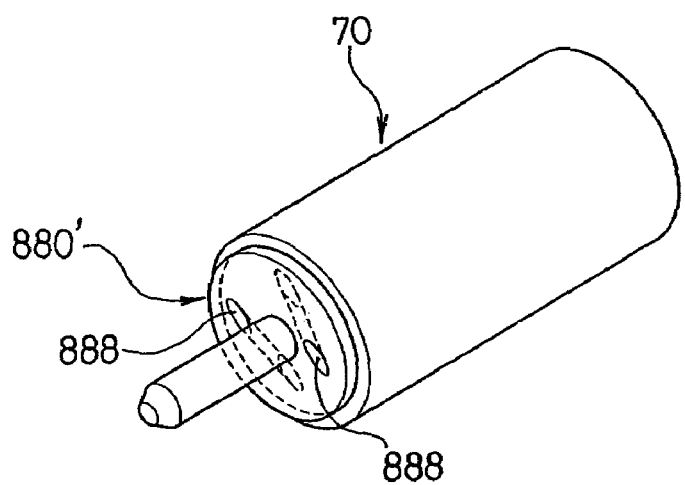
FIG. 9 is a view showing a mover including rotation means according to a fifth example.

FIG. 9 shows a mover 70 including rotation means according to a fifth example. This fifth example is a variation of the fourth example. A spacer 880' is integrally formed on an end face of the anchor 72 of the mover 70 and rotation force is obtained by utilizing the spacer 880'. In the spacer 880' according to this example, the fuel oil flowing through a slantwise throughhole 888 exerts rotation force to the mover 770 by providing the throughhole 888 to the spacer 880' itself.

MOVER INCLUDING ROTATION MEANS ACCORDING TO SIXTH EXAMPLE

Figure 10:
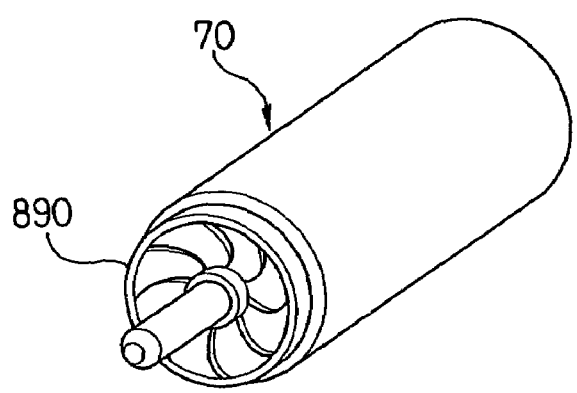
FIG. 10 is a view showing a mover including rotation means according to a sixth example.

FIG. 10 shows a mover 70 including rotation means according to a sixth example. This sixth example is also a variation of the fourth and fifth examples. A spacer 890 is integrally formed on an end face of the anchor 72 of the mover 70 and rotation force is obtained by utilizing the spacer 890. The spacer 890 is of a fan type and includes a fan which is rotated by the flowing fuel oil.

MOVER INCLUDING ROTATION MEANS ACCORDING TO SEVENTH EXAMPLE

Figure 11:
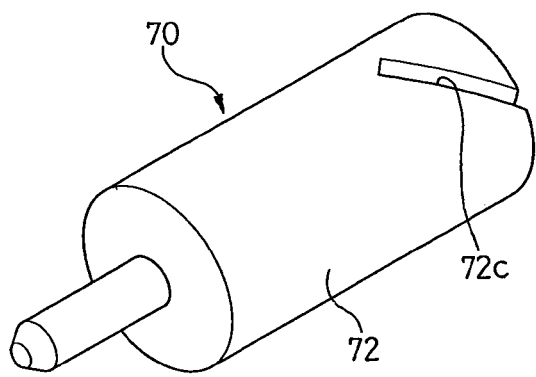
FIG. 11 is a view showing a mover including rotation means according to a seventh example.

FIG. 11 shows a mover 70 including rotation means according to a seventh example. In this seventh example, a cam groove 72c is provided to the anchor 72 side of the mover 70 and a pin is provided to the bush 78 side, thereby generating a cam action by the pin and the cam groove 72c. By combining this example with any other example, rotation of the mover 70 can be obtained more reliably.

MOVER INCLUDING ROTATION MEANS ACCORDING TO EIGHTH EXAMPLE

Figure 12:
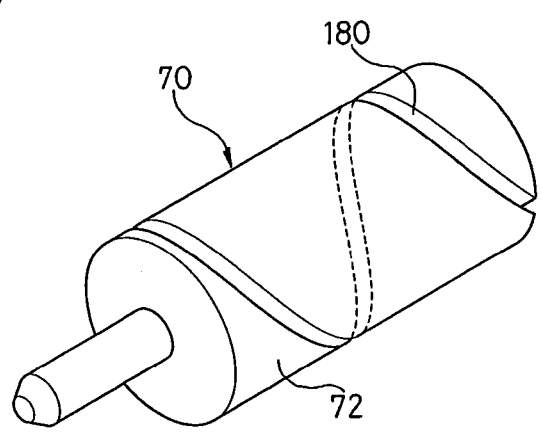
FIG. 12 is a view showing a mover including rotation means according to an eighth example.

FIG. 12 shows a mover 70 including rotation means according to an eighth example. In this eighth example, a helical groove 180 is formed in the outer peripheral surface of the mover 70 in such a manner as to extend from one end of the anchor 72 to the other end. This helical groove 180 is functioned as a flow passageway for intercommunicating the first and second chambers 510, 520 and as rotation means for rotating the mover 70. It is also accepted that in order to avoid the groove machining at the inner peripheral portion of the bush 78, hole machining is made with respect to that portion of the inside of the anchor 72 which corresponds to the inner peripheral portion of the bush 78 where a groove would otherwise be formed, and this internal hole is communicated with the helical hole.

MOVER INCLUDING ROTATION MEANS ACCORDING TO NINTH EXAMPLE

Figure 13:
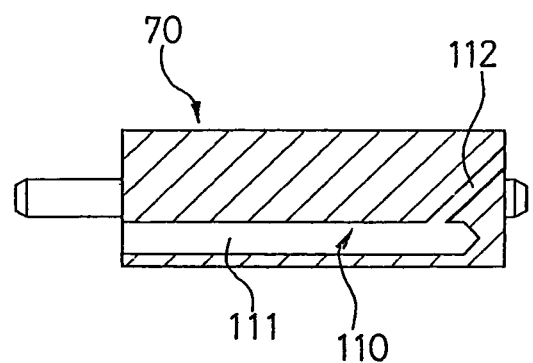
FIG. 13 is a sectional view showing a mover including rotation means according to a ninth example.

FIG. 13 shows a mover 70 including rotation means according to a ninth example. In this ninth example, a single flow passageway 110 is employed. The flow passageway 110 includes a linear passageway portion 111 in parallel with and along the axis and a slantwise passageway portion 112 which extends from the linear passageway portion 111 in such a manner as to cross the axis. It is similar to the first and second examples previously mentioned above.

The invention claimed is:

1. A fuel injection system comprising a low pressure feed pump for pumping up fuel oil as fluid from a fuel tank, an amount control throttle valve for controlling, under the throttling effect, an amount of fuel oil fed by said feed pump and a supply pump for boosting the fuel oil, which has been controlled in amount by said amount control throttle valve, to higher pressure by movement of a plunger and supplying the same to fuel injection means, wherein said amount control throttle valve is a flow rate control valve for controlling the flow rate of fluid flowing through a valve by controlling opening/closing of said valve under the effect of electromagnetic force, wherein said flow rate control valve comprises a housing having an axis and an internal space, a cylindrical columnar mover placed in the internal space of said housing and movable in the axial direction under the effect of electromagnetic force while defining a first chamber and a second chamber which are closed by opposite end portions thereof, a valve member for controlling a passageway area through which the fluid flows, in response to the movement of said mover, and a flow passageway attached to said cylindrical columnar mover and for flowing the fluid from said first chamber to said second chamber or vice versa, in accordance with the movement of said mover, and wherein said flow rate control valve further comprises rotation means for rotating said mover about said axis by using of a work of the fluid flowing through said flow passageway and wherein the flow passageway attached to the cylindrical columnar mover is separated from the passageway including the valve through which the fluid to be controlled flows.

2. A flow rate control valve for controlling the flow rate of fluid flowing through a valve by controlling opening/closing of said valve under the effect of electromagnetic force, wherein said flow rate control valve comprises a housing having an axis and an internal space, a cylindrical columnar mover placed in the internal space of said housing and movable in the axial direction under the effect of electromagnetic force while defining a first chamber and a second chamber which are closed by opposite end portions thereof, a valve member for controlling a passageway area through which the fluid flows, in response to the movement of said mover, and a flow passageway attached to said cylindrical columnar mover and for flowing the fluid from said first chamber to said second chamber or vice versa, in accordance with the movement of said mover, and wherein said flow rate control valve further comprises rotation means for rotating said mover about said axis by using of a work of the fluid the fluid flowing through said flow passageway, and wherein the flow passageway attached to the cylindrical columnar mover is separated from the passageway including the valve through which the fluid to be controlled flows.

3. A flow rate control valve according to claim 2, wherein the fluid is fuel for a diesel engine or gasoline engine, and said flow rate control valve is for controlling an amount of fuel as the fluid which is to be fed from a low pressure side to a high pressure side.

4. A flow rate control valve according to claim 2, wherein said housing and said mover are arranged in a direction generally horizontal to said axis, and said mover is supported at least at one spot in the axial direction within said housing.

5. A flow rate control valve according to claim 2, wherein said rotation means also serves as said flow passageway and comprises a plurality of passageways which are disposed within said mover, said passageways being in symmetrical relation about said axis, each of said passageways including a portion crossing with respect to said axis.

6. A flow rate control valve according to claim 2, wherein said rotation means also serves as said flow passageway and comprises a single passageway which is disposed within said mover, said passageway including a portion crossing with respect to said axis.

7. A flow rate control valve according to claim 2, wherein said rotation means also serves as said flow passageway and includes, at least at a part thereof, a groove passageway disposed at an outer peripheral surface of said mover.

8. A flow rate control valve according to claim 2, wherein said mover integrally supports, at one end face thereof, a ring-like spacer for preventing the linkage of said mover with said housing side when said mover moves in the axial direction, said spacer functioning as said rotation means.

9. A flow rate control valve according to claim 5, wherein said mover is coincident at a location of its gravity with said axis.

* * * * *